United States Patent [19]
Cothrell

[11] Patent Number: 5,181,445
[45] Date of Patent: Jan. 26, 1993

[54] OPTIMIZING CUTOFF SAW
[75] Inventor: Leroy E. Cothrell, Gresham, Oreg.
[73] Assignee: Ultimizer's Inc., Boring, Oreg.
[21] Appl. No.: 792,610
[22] Filed: Nov. 15, 1991
[51] Int. Cl.$^5$ .............................................. B26D 5/20
[52] U.S. Cl. ............................. 83/155; 83/271;
   83/422; 144/3 N; 144/2 M; 144/332; 144/356
[58] Field of Search .............. 83/424, 271, 371, 75.5,
   83/209, 210, 276, 155, 435.2, 428, 363, 367, 422;
   198/626.6, 725, 345.1, 626.4; 144/3 N, 2 M, 2
   AA, 356, 332

[56] References Cited
U.S. PATENT DOCUMENTS

| | | | |
|---|---|---|---|
| 1,728,163 | 9/1929 | Maas | 83/271 |
| 3,063,479 | 11/1962 | Prentice | 83/210 |
| 3,079,963 | 3/1963 | Jensen | 144/3 N |
| 3,301,114 | 1/1967 | Joa | 83/276 X |
| 3,459,289 | 8/1969 | Roseman | 198/626.6 |
| 3,670,614 | 6/1972 | Streckert | 83/369 X |
| 3,780,777 | 12/1973 | Davies | 83/371 X |
| 3,797,341 | 3/1974 | Bystron | 83/938 X |
| 3,981,212 | 9/1976 | McCain et al. | 83/155 |
| 4,054,070 | 10/1977 | Steiling | 83/208 |
| 4,294,144 | 10/1981 | Hayes | 83/71 |
| 4,611,646 | 9/1986 | Wassmer et al. | 198/626.6 X |
| 4,687,035 | 8/1987 | Kuper et al. | 83/371 X |
| 4,934,229 | 6/1990 | Greten et al. | 83/371 X |

Primary Examiner—Frank T. Yost
Assistant Examiner—Kenneth Peterson
Attorney, Agent, or Firm—Kolisch Hartwell Dickinson McCormack & Heuser

[57] ABSTRACT

An improved automatic board cutoff saw that maintains better positional accuracy at higher board speeds is disclosed. The improved automatic cutoff saw includes an overhead belt conveyor including a first belt for starting, stopping and advancing the board in frictional engagement therewith over a substantial length both upstream and downstream from a crosscut saw station, as well as a second belt conveyor disposed beneath the first belt conveyor near an infeed region of the crosscut saw station for engaging the underside of the board during its advancement through therethrough. One of a pair of rollers disposed on a pivotal arm of the overhead belt conveyor, the arm being pivoted by tension in the first belt, is urged into a position whereby a board, which may be of scant height, nevertheless is positively, frictionally engaged by both belt conveyors at least during the critical infeed phase of the board-advancing operation.

1 Claim, 1 Drawing Sheet

OPTIMIZING CUTOFF SAW

BACKGROUND AND SUMMARY OF THE INVENTION

The present invention relates to an improved cutoff saw that is capable of optimizing yield in accordance with predefined yield criteria in an automatic board crosscutting operation. More specifically, it concerns board handling speed and accuracy improvements to a continuous, driven belt conveyor-type cutoff saw having a first belt conveyor disposed in frictional engagement with an upper surface of a board both upstream and downstream of the saw by the provision of a second continuous belt conveyor disposed below the first belt conveyor along a substantial extent of the same and upstream from the cutoff station in a board infeed zone, with the second belt conveyor being driven synchronously with the first belt conveyor. The first belt conveyor includes a belt and a pair of rollers mounted for rotation on a pivotal arm that is urged by tension in the first belt into a position whereby the board is grippingly engaged between the first and second belt conveyors.

Prior art automatic board cutoff saws have provided for the positive hold-down of boards both upstream and downstream from a vertically reciprocable circular saw blade that, while the board is stopped at a predetermined location to make a desired crosscut, is raised to make a planar cut therein. One such advanced automatic cutoff saw is the Series III Ultimizers TM cutoff saw made by Ultimizers, Inc. of Boring, Oreg., which is the assignee of rights in the present application. The Series III cutoff saw uses a continuous belt conveyor to advance a board of nominal thickness through, and to hold down the board in, the cutoff station by frictionally engaging it along substantial lengthwise extents on either side of the cutoff station. The Series III saw's continuous, overhead conveyor belt avoids the vertically reciprocating path of the circular saw blade by traversing a path therearound, leaving all but a marginal region of the board adjacent the intended cut in continuous frictional engagement by the belt conveyor throughout the infeed, cut and advance phases of automatic operation.

In the operation of conventional cutoff saws, boards may be automatically or manually mark sensed, e.g. using a special crayon-like marker to indicate desired cut lengths or locations, or to indicate undesirable board sections, e.g. the location of a knot, wane or bend. By appropriately programming the controller, 'intelligent' determinations automatically are made regarding the optimal series of cuts that will maximize a particular board's yield. An automatic mark-sense reader near the infeed location of the Series III cutoff saw reads the coded markings and the controller controls the belt conveyor to start, advance and stop the conveyor belt, and thus the board frictionally engaged thereby, as it approaches, traverses and departs the cutoff station. With such automatic cutoff saws, it has been possible to maintain high accuracy and repeatability in board handling and crosscutting at relatively high linear speeds, e.g. up to approximately thirty feet per second (30-fps).

Despite the high quality and throughput of automatic cutoff saws such as the Series III Ultimizers TM cutoff saw, there remains room for improvement in their board handling technique, especially at the infeed and outfeed locations. Proper placement, alignment and control of a board significantly impacts the accuracy of crosscuts made thereon, and has the potential of maximizing yield and minimizing waste. The infeed and outfeed stations are locations where jamming frequently occurs, especially as the linear speed of the belt conveyor is increased to improve board throughput. Heretofore, these problems, to which even the state of the art Ultimizer TM Series III cutoff saw is subject, remained unsolved.

Accordingly, it is an object of the present invention to achieve an increase in linear speed on overhead belt conveyors used in optimizing cutoff saws, while greatly improving positional accuracy.

It is another important object of the invention to reduce the frequency with which boards jam in such cutoff saws.

Another important object is to bring about such improvements in such manner that existing installations can be retrofitted with the improvements easily and cost effectively.

In brief summary, the invention in its preferred embodiment takes the form of a second belt conveyor disposed beneath the overhead belt conveyor in the infeed region of the cutoff saw and driven synchronously therewith, wherein the second belt conveyor extends longitudinally of, and thus frictionally engages over a substantial length, the board therein. Means for synchronizing the linear speed of the second, lower belt conveyor, in relation to that of the first, overhead or upper belt conveyor is accomplished by a controller that provides synchronization signals to the servo motors that drive each belt of the belt conveyors. Preferably, a pair of rollers of the upper belt conveyor are mounted for rotation on a pivotable member the pivotal position of which is determined by tension in the upper belt, wherein the member's position urges one of the rollers and thus the first belt into frictional engagement with a board, thereby grippingly engaging the board, which may be slightly undersized in thickness, between the upper and the lower belts. At the outfeed location of the crosscut saw, the throat is opened slightly by the reduced dimensioning of one of the upper conveyor's rollers to accommodate a board-in-process the leading end of which may be slightly elevated as the vertically reciprocable circular saw is in its raised position. The result of these and other improvements is greatly improved board control and the positional and orientational accuracy of crosscuts made therein.

These and other objects and advantages of the invention will be better understood by reference to the accompanying drawings and the following description.

DETAILED DESCRIPTION OF THE PREFERRED EMBODIMENT

Figure 1:
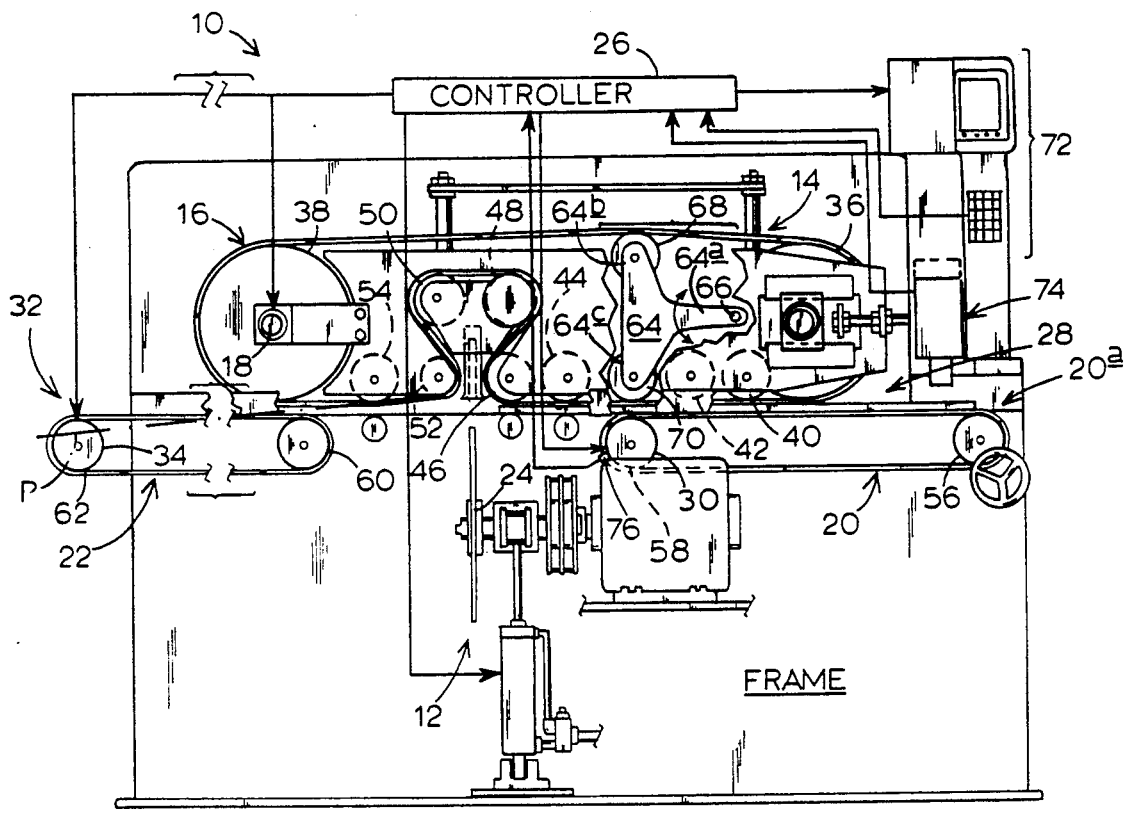
FIG. 1 is a front elevation showing the optimizing cutoff saw made in accordance with the preferred embodiment of the invention.
Figure 2:
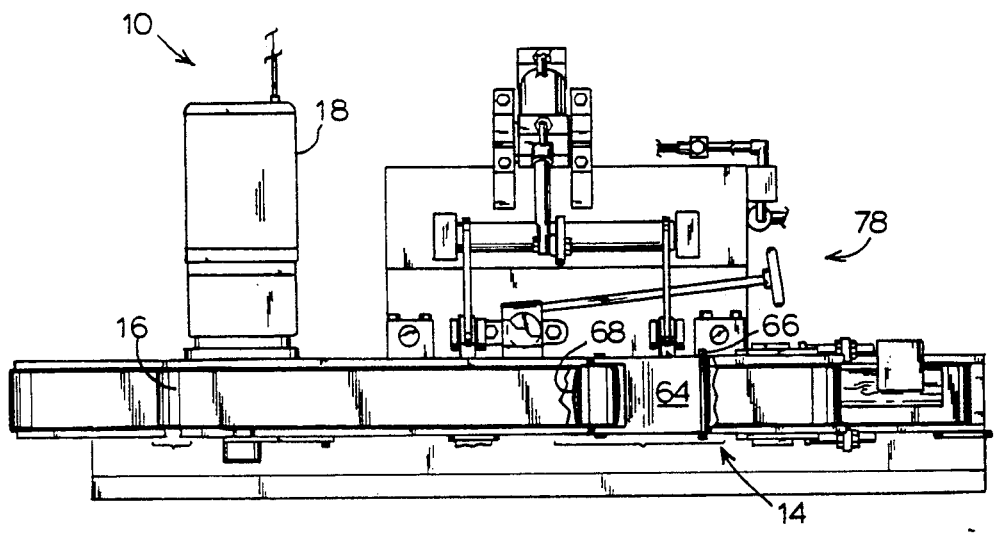
FIG. 2 is a top view of the cutoff saw shown in FIG. 1.

Referring collectively to FIGS. 1 and 2, a front elevation and a top plan view, respectively, of the apparatus of the invention in its preferred embodiment, indicated generally at 10, are shown. Improved, yield-optimizing automatic cutoff saw apparatus 10 includes crosscutting means, indicated generally at 12, for cutting a board B in at least one predetermined location therealong and start-stop conveyance means, indicated generally at 14, for controllably feeding or advancing board B past or through crosscutting means 12. Start-stop conveyance means 14 preferably includes a first, upper belt conveyor, indicated generally at 16, and suitable drive means, e.g. a servo motor, 18 (refer to the top plan view of apparatus 10 in FIG. 2). Conveyance means 14 also includes a second, lower belt conveyor 20 and a third, lower belt conveyor 22.

In the operation of apparatus 10, first belt conveyor 16 preferably includes an operative length of belt disposed above board B that is in frictional engagement, as shown in FIG. 1, with an upper surface of the board along a substantial lengthwise extent of the belt conveyor upstream and downstream of crosscutting means 12. This is made possible, despite the fact that belt conveyor 16 includes a singular, continuous, looped belt, by the fact that the belt traverses a serpentine path around crosscutting means 12, which includes an upwardly/downwardly reciprocable circular saw 24. Belt conveyor 16 is driven by drive means 18 in predefined timing relation with crosscutting means 12 in such manner as to synchronize the stopping of the board therewithin with the upward movement of circular saw 24. A programmable controller 26 provides for the starting, conveying and stopping of a board with predetermined locations therealong aligned for cutting within crosscutting means 12.

Importantly, cutoff saw 10 is provided with driven board infeed and support means 28 including an upstream run of driven first belt conveyor 16, second belt conveyor 20 disposed at least in part thereunderneath and drive means, or a servo motor, 30 operatively associated with second belt conveyor 20. Driving of second, lower belt conveyor 20 has been found substantially to reduce the incidence of jamming of boards in an infeed region of a cutoff saw of the type described herein. Controller 26 is programmed to provide for the starting, conveying and stopping of a board in synchronization with first, upper belt conveyor 16.

Providing conveyance means 14 with driven infeed means 28, disposed upstream from crosscutting means 12, for controllably feeding board B from a pickoff location 20a downstream (to the left in FIGS. 1 and 2) toward crosscutting means 12 has been found greatly to improve the accuracy and repeatability of the desirably high-speed operation of a cutoff saw. Infeed means 28 may be seen to include an upstream run of first belt conveyor 16 disposed above the board and at least a downstream run of second belt conveyor 20, disposed beneath first belt conveyor 16, that extends in parallel relationship substantially along the upstream run of first belt conveyor 16 in a region of the first belt conveyor 16 that is located upstream (to the right in FIGS. 1 and 2) of crosscutting means 12. By their frictional engagement of the top and bottom surfaces of board B along a substantial lengthwise extent thereof and their cooperative urging of board B downstream by synchronously controlled drive means 18, 30, first and second belt conveyors 16, 20 of driven infeed means 28 greatly reduce the incidence of jamming in cutoff saws of the type described herein.

In brief summary of this improvement to a cutoff saw, it will be appreciated that a substantial upstream run of first, upper belt conveyor 16 and a substantial downstream run of second, lower belt conveyor 20 cooperate to provide for the gripping engagement of a board B being advanced downstream thereby over a substantial, upper surface and an opposing, substantial, lower surface of the board. Such gripping engagement yields unprecedented board control and results not only in relative jam-proof operation of improved cutoff saw 10 but also in greatly improved accuracy. For example, dimensional tolerances approaching 1/100th-inch (10-mils), in the accuracy of the placement of crosscuts, are achievable with the improved cutoff saw when it is constructed in accordance with the preferred embodiment described herein.

Conveyance means 14 in its preferred embodiment includes driven cut-board outfeed means 32 including a downstream run of driven first, upper belt conveyor 16, third, lower belt conveyor 22 disposed at least in part therebeneath, and drive means, or a servo motor 34 operatively associated with belt conveyor 22. Driving of third, lower belt conveyor 22 has been found substantially to reduce the incidence of jamming of cut boards in the outfeed region of a cutoff saw of the type described herein. Controller 26 is programmed, in accordance with conventional programming techniques, to provide for the starting, conveying and stopping of third belt conveyor 22 in synchronization with first belt conveyor 16 and second belt conveyor 20. Those skilled in the art will appreciate that third belt conveyor 22 cooperates with a parallel, downstream run of first belt conveyor 16 to provide for the gripping engagement of a cut board piece as it is advanced downstream from crosscutting means 12.

Focusing now on FIG. 1, the various rollers that form parts of, and which control the paths along which travel, first belt conveyor 16, second belt conveyor 20 and third belt conveyor 22 are described. First (upper) belt conveyor end rollers 36, 38 are seen to be associated with the upstream and downstream ends, respectively, of first belt conveyor 16. Intermediate rollers 40, 42, 44, 46, 48, 50, 52, 54 are provided between end rollers 36, 38 of first belt conveyor 16, thereby to determine and to control the path of the driven belt. Second (lower) belt conveyor end rollers 56, 58 are seen to be associated with the upstream and downstream ends, respectively, of second belt conveyor 20. Third (lower) belt conveyor end rollers 60, 62 are seen to be associated with the upstream and downstream ends, respectively, of third belt conveyor 22. Preferably, at least end rollers 36, 38, 56, 58, 60, 62 have a slightly convexly outwardly curved operative (generally cylindrical) surface, as is conventional, thereby to provide improved tracking thereon by the corresponding conveyor belts.

It may be seen from FIG. 1 that the shafts on which end rollers 36, 38 are mounted for rotation define a first, generally horizontal plane. It may also be seen that the shafts on which intermediate rollers 40, 42, 44, 46, 52, 54 are mounted for rotation define a second, generally horizontal plane parallel with and beneath the first plane. Finally, it may be seen that the shafts on which end rollers 56, 58, 60, 62 are mounted for rotation define a third, generally horizontal plane parallel with and beneath the second plane.

Such planar configurations and the fact that rollers 36, 38 are identically sized with one another, that rollers' 40, 42, 44, 46, 54 are identically sized with one another and are positioned such that their lower belt-engaging surfaces are co-planar with the lower extents of rollers 36, 38, and that rollers 56, 58, 60, 62 are identically sized with one another produce lower horizontal runs of first belt conveyor 16 that are coplanar with one another and spaced in parallel relationship above upper runs of second and third belt conveyors 20, 22 that also are coplanar with one another. Those of skill will appreciate that any suitable number of intermediate rollers may be provided in first, second and third belt conveyors 16, 20, 22.

Two important aspects of the invention are apparent from FIG. 1. First, it is noted that so-called "output" roller 52 of first belt conveyor 16 disposed immediately downstream of crosscutting means 12 is of smaller diameter than so-called "input" roller 46 of first belt conveyor 16 disposed immediately upstream thereof and than remaining intermediate rollers 40, 42, 44, 48, 50, 52, 54 of first belt conveyor 16. This reduced-diameter roller configuration, which may be seen from FIG. 1 to widen the throat through which the leading edge of a board-in-process passes immediately downstream of crosscutting means 12, has been found greatly to reduce the likelihood of jamming and greatly to improve the smooth transition of the board-in-process between crosscutting means 12 and cut-board outfeed means 32. When a board is being crosscut near its leading edge, often the leading edge of the board will be urged slightly upwardly by the upward movement of circular saw 24. By the improvement described herein, such upward movement is accommodated but controlled by the down-sizing of roller 52, which in cooperation with downstream roller 54 and the belt of first belt conveyor 16 defines therebetween a slightly downwardly inclined planar run that impacts on the leading edge of the board-in-process and urges it downwardly and forwardly until it is grippingly engaged between first belt conveyor 16 and third belt conveyor 22.

Those of skill will appreciate that there are alternatives, within the spirit of the invention, to providing a smaller diameter roller to accomplish improved outfeeding of cut boards. For example, a roller of identical diameter to the other intermediate rollers of the upper conveyor belt instead could be mounted for rotation on a shaft that is located above the plane defined by the location of the other intermediate rollers. Other means of producing an inclined plane P (refer to the dot-dash line in FIG. in a run of first belt conveyor 16 immediately downstream of crosscutting means 12 also would serve to minimize the incidence of jamming in the cutboard outfeed region of cutoff saw apparatus.

Second, it is noted that two additional, intermediate rollers are mounted for rotation on shafts connected with a pivotable member 64. Pivotable member 64 is preferably generally T-shaped as shown (rotated 90° counterclockwise in FIG. 1) with a first arm 64a mounted for pivotal rotation on a frame-mounted shaft 66 and with preferably symmetrically extending second and third arms 64b, 64c that mount for rotation the upper and lower intermediate rollers 68, 70, respectively, which rollingly engage an upper and lower run of first belt conveyor 16. Importantly, the vertical span, or farthest operative reach, of rollers 68, 70 is slightly greater than the diameter of end rollers 36, 38 of first belt conveyor 16. As a result of this dimensional relationship, pivotable member 64 normally is urged pivotally by the belt of belt conveyor 16 into a position such that the upper and lower belt-engaging surfaces of rollers 68, 70 extend approximately equally above and below the upper and lower belt-engaging surfaces of end rollers 36, 38.

When the downstream end of board B of a nominal thickness advanced downstream by infeed means 28 reaches roller 70, pivotable member 64 is pivoted slightly (in a clockwise direction in FIG. 1) to accommodate the board between first and second belt conveyors 16, 20. Roller 70 tracks the upper surface of board B due to the tension in the belt of belt conveyor 16. Thus a scant board, i.e. a board of less than nominal thickness, would be grippingly engaged between a run of belt conveyor 16 in the vicinity of roller 70 and an opposing run of belt conveyor 20 in the vicinity of end roller 58, which preferably is disposed directly therebeneath with the shafts on which rollers 58, 70 rotate defining a vertical plane. Pivotable member 64 together with first belt conveyor 16 are described herein as leveraging means that urges the shaft on which roller 70 is mounted for rotation toward board B to provide for the gripping engagement thereof between the belts of first and second belt conveyors 16, 20.

Those skilled in the art will appreciate that the leveraging means described above may take different forms. For example, the leveraging means may be disposed adjacent second belt conveyor 20 rather than (or in addition to) first belt conveyor 16, urging a movable shaft mounting roller 58 toward a stationary shaft mounting a roller such as roller 70. In any event, at least one of first and second belt conveyors 16, 20 includes a first roller, e.g. lower roller 70, around which the belt of such belt conveyor travels, with the first roller rotating on a shaft urged by the leveraging means toward board B to provide gripping engagement of board B between the belts of first and second belt conveyors 16, 20.

The leveraging means may be thought of as including a pivotable member 64 mounting this first roller, e.g. roller 70, and also mounting a second roller, e.g. roller 68, with the first and second rollers engaging a first and a second run of one of the belts of first and second belt conveyors 16, 20, e.g. a first run of first belt conveyor 16 operatively engaging the top, outer surface of roller 68 and a second run of first belt conveyor 16 operatively engaging the bottom, outer surface of roller 70, as shown in FIG. 1. Responsive to tension in the belt of first belt conveyor 16, the first and second rollers tend to pivot member 64, thereby to urge roller 70, and in turn a lower run of the belt of first belt conveyor 16 directly therebeneath, into frictional engagement with the upper surface of a board, whether the board is of nominal or scant thickness.

Those skilled in the art will appreciate that the leveraging means may urge the movable shaft mounting either one (or perhaps both) of the rollers associated with first or second belt conveyor 16, 20 by spring or other tension or compression, etc., rather than by using the tension in one of the belts of the first or second belt conveyor. Those of skill also will appreciate that other modifications are possible within the spirit of the invention that provide for the gripping engagement, above and below and substantially along an upper and lower surface, of a board that may be of less than nominal thickness, thereby greatly improving the accuracy and reliability of a cutoff saw in handling scant boards.

Upstream from second belt conveyor 20, apparatus 10 includes means 72 for mark-coding board B with the locations, for example, of knots or other defects and means 74 for mark-sensing such coded marks. Mark-coding means 72 may be of conventional design, whether manual or automatic, that is compatible with mark-sensing means 74, and may include, for example, a data entry keyboard 76, a display monitor 78 and one or more so-called 'crayons' (not shown) for coding defects on the surface or edge of board B. Mark-sensing means 74 for producing a signal indicative (at least) of the location of a mark on board B may be conventional, and may include, for example one or more optical transducers capable of sensing, and, in cooperation with controller 26, deciphering, coded marks on one or more of the four outer surfaces thereof.

As indicated schematically in FIG. 1, controller 26 reads data input via keyboard 76 and sends data to monitor 78 for display thereon. Controller 26 also produces control signals to mark-sensing means 74, reads mark-coded signal inputs from mark-sensing means 74, and, responsive thereto, sequences the operations of mark-sensing means 74, crosscutting means 12 and start-stop conveyance means 14 to controllably advance marked board B through crosscutting means 12 and onto outfeed conveyor 32. Conveyance means 14 thus may be seen to advance board B through crosscutting means 12 in response to a signal produced by mark-sensing means 74, and crosscutting means 12 may be seen to produce a crosscut in board B at an indicated location also in response to the signal produced by mark-sensing means 74.

It may be seen by reference to FIGS. 1 and 2 that all components of the improved automatic cutoff saw are suitably and conventionally FRAME-mounted. Controller 26, which in FIG. 1 is indicated schematically, typically would be mounted also to FRAME, perhaps within an electronics and power supply compartment within a space formed thereby. Other components of apparatus 10 are shown in FIGS. 1 and 2, including belt position encoding means 76 preferably operatively coupled as shown with second belt conveyor 20 for producing a signal to controller 26, wherein the signal is representative of the position of the board relative to crosscutting means 12 and means 78 for manually adjusting the elevation of upper belt conveyor 16 relative to lower belt conveyors 20, 22.

The invention now may be seen to represent a substantial improvement over even state-of-the-art automatic cutoff saws of the type described in the Background and Summary above that have generally planar board infeed and support means 28; a first driven belt conveyor 16 disposed thereabove, with the belt conveyor including a first continuous belt that traverses a generally circular path (such as that shown in FIG. 1) around plural rollers 36, 38, 40, 42, 44, 46, 48, 50, 52, 54 and means including servo motor 18 controlled by controller 26 for starting and stopping the belt, wherein the lower surfaces of certain ones 36, 38, 40, 42, 44, 46, 54 of the rollers define a generally horizontal plane at a predetermined, nominally board-thick, height above the plane defined by board infeed and support means and wherein certain others 32 46, 48, 50, 52 of the rollers provide a detour path for the first belt adjacent a crosscutting circular saw 24 that is vertically reciprocable through the plane of the board infeed and support means to form a crosscut in a board, e.g. board B, advanced to and stopped, as shown in FIG. 1, at a desired position relative to saw 24.

The improvement may be seen to comprise driven conveyance means, or second belt conveyor, 20, disposed beneath first belt conveyor 16, driven conveyance means 20 including a second continuous belt driven, e.g. by servo motor 30 under the control of controller 26, synchronously with the first continuous belt to positively, grippingly engage a board throughout an infeed phase of operation of cutoff saw apparatus 10. The improvement may be seen also to comprise pivotable member 64 disposed above driven conveyance means 20 and mounting for rotation thereon an upper roller 68 and a lower roller 70 for engaging the first continuous belt of first belt conveyor 16, with pivotable member 64 being positioned by tension in the first belt to grippingly engage a board between the first belt, in the vicinity of lower roller 70, and the second belt. Finally, the improvement may seen in its preferred embodiment to be characterized by the fact that at least one roller of the first driven belt conveyor 16 which is disposed downstream of the crosscut saw, e.g. intermediate roller 52, is positioned with its lower, belt-engaging surface above the plane defined by rollers 36, 38, 40, 42, 44, 46, 54.

Summarizing, the improvements are seen to better equip apparatus 10 to process scant boards, and more accurately and repeatably at high speed to produce crosscuts at predetermined locations in boards without jamming. Driving second lower belt conveyor 20 synchronously with first upper belt conveyor 16; variably positioning roller 70 based upon the tension in first belt conveyor 16; and slightly inclining the plane P of a run of belt conveyor 16 downwardly in the downstream direction to slightly open a throat into which a board-in-process is fed immediately downstream of crosscutting means 12 will be seen to be effective independently and in a variety of embodiments to provide certain advantages and will be seen to be effective in combination to provide great advantages in the operation of optimizing cutoff saws.

Accordingly, while a preferred embodiment of the apparatus of the invention has been described herein, it is understood that modifications are possible that come within the spirit of the invention.

It is claimed and desired to secure by Letters Patent:

1. An improved cutoff saw comprising:
   crosscutting means for cutting a board of plural predetermined locations therealong, and
   conveyance means for feeding the board past said crosscutting means, said conveyance means including means for starting and stopping the board with the predetermined locations aligned for cutting within said crosscutting means, said conveyance means including a first belt conveyor disposed above the board and in frictional engagement with an upper surface thereof along a substantial lengthwise extent thereof upstream and downstream of said crosscutting means, said first belt conveyor being driven in predefined timing relation with said crosscutting means, said conveyance means further including driven infeed means operatively associated with said first belt conveyor and including a second belt conveyor disposed below the board and in frictional engagement with a lower surface thereof along a substantial lengthwise extent thereof upstream of said crosscutting means;
   wherein at least one of said first and second belt conveyors includes a first roller around which a belt of said one belt conveyor travels, said first roller rotating on a shaft urged by leveraging means toward the board to provide gripping engagement with the board between the belts of said first and second belt conveyors; and
   wherein said leveraging means includes a pivotable member mounting said first roller and a second roller, said first and said second rollers engaging a first and a second run of one of said belts of said first and second belt conveyors and being responsive to tension in said one belt to pivot said member.

* * * * *

UNITED STATES PATENT AND TRADEMARK OFFICE
CERTIFICATE OF CORRECTION

PATENT NO. : 5,181,445

DATED : January 26, 1993

INVENTOR(S) : Leroy E. Cothrell

It is certified that error appears in the above-identified patent and that said Letters Patent is hereby corrected as shown below:

In column 8, line 35, delete "of" and insert --at--.

Signed and Sealed this

Fifth Day of April, 1994

Attest:

BRUCE LEHMAN

Attesting Officer

Commissioner of Patents and Trademarks